Patented Nov. 13, 1951

2,575,282

UNITED STATES PATENT OFFICE 2,575,282

SELECTIVE CRAB GRASS HERBICIDAL COMPOSITIONS CONTAINING OXO BOTTOMS

John F. McKay, Jr., Cranford, and Leo Z. Jasion, Elizabeth, N. J., assignors to Standard Oil Development Company, a corporation of Delaware No Drawing. Application April 18, 1950, Serial No. 156,719

3 Claims. (Cl. 71—2.3)

This invention relates to improved selective herbicidal oils for the eradication of crab grass. More particularly, this invention relates to crab grass selective herbidical solutions containing small amounts of a liquid synthesis product mixture known as Oxo Bottoms admixed with a sulphuric acid-treated kerosene.

The problem of growing a lawn of good turf grass free of the rapidly spreading, pestiferous grass known as "crab grass" (*Digitaria sanguinalis* or *Digitaria ischaemum*) has always plagued property owners. Removal of this noxious weed from infested lawns by hand is a time-consuming and tedious operation.

Commercial preparations which are marketed for crab grass control such as sodium arsenite preparations or phenylmercuric acetate water compositions are not entirely satisfactory for several reasons. Complete selective kill of the crab grass is usually not obtained and much of the turf is severely injured so that in many cases reseeding is necessary. In addition, in most cases, even moderate crab grass control cannot be obtained unless the first application of the herbicide is made on lawns when the crab grass is in the seedling stage. The average property owner neglects to treat his lawn at this critical period. It is time-consuming and expensive to make the three or four repeat applications recommended for crab grass control. Rainfall shortly after application washes the toxicant off the grass, making many of the applications ineffective. Since the arsenic and mercury compounds used in commercial crab grass killers are toxic to animals and human beings, and can cause soil sterilization if used repeatedly in high concentrations, it is desirable to use these toxicants in as low a concentration as possible yet still get herbicidal action. The repeated dosages required of the before-mentioned preparations makes it difficult to maintain the concentrations of the active ingredients at these low levels necessary for turf grass and human safety.

It has now been found that sulfuric acid-treated kerosenes, when fortified with particular liquid synthesis products derived from the reaction between olefins, carbon monoxide and hydrogen, the latter known as Oxo Bottoms, are ideally adapted to overcome the before-mentioned difficulties.

The selective oil compositions of this invention give "single shot" kills of crab grass. In addition, the compositions of this invention are extremely resistant to weathering, which also contributes to the economy of the use of these compositions.

It is surprising to find that the particular oil compositions of this invention are superior selective crab grass herbicides because each of the oils singly is unsuited for use as a selective herbicide. Thus, sulfuric acid-treated kerosene is itself completely innocuous on crab grass and turf grasses. The Oxo Bottoms on the other hand by itself kills turf grass and is relatively innocuous to crab grass. These oils, which are thus unsuitable by themselves as selective crab grass herbicides, cooperate in a synergistic manner to produce compositions of outstanding characteristics as selective crab grass eradicants in ornamental turf.

The sulfuric acid-treated kerosene utilized in the oils of this invention is also known as "Bayol D" and "deodorized kerosene." Its preparation, i. e., by treating kerosene with fuming or concentrated sulfuric acid, is well known in the art. This acid treated kerosene has a specific gravity in the range of about 0.775–0.825, a boiling point predominantly in the range of about 400°–505° F., and is substantially free of aromatics, i. e., contains only a trace. A typical inspection is as follows:

| | |
|---|---:|
| Specific Gravity | 0.810 |
| A. S. T. M. Dist., °F.: | |
|   I. B. P | 400 |
|   F. B. P | 505 |
| Mixed Aniline Point, °F | 175 |
| Flash Point, °F | 160 |
| Unsulfonated Residue, per cent | 97 |
| Sulfur, Lamp | 0.02 |
| Color, Saybolt | 25 |
| Per cent aromatics | Trace |

The Oxo Bottoms product is produced by what is now the well known two-stage process for producing Oxo alcohols (see e. g. .U S. Patent 2,327,066). In the first stage an olefinic material, a carbonylation catalyst, and CO and $H_2$ are reacted to give a product which consists predominantly of aldehydes. This material is catalytically hydrogenated in the second stage to give the corresponding alcohols. The over-all reaction may be formulated as follows:

Stage 1. $R-CH=CH_2 + CO + H_2 \rightarrow RCH_2-CH_2CHO$
Stage 2. $RCH_2CH_2CHO + H_2 \rightarrow RCH_2CH_2CH_2OH$ Both the aldehyde and the alcohol formed as a result of the reaction contain one more carbon atom than the olefinic material from which they are derived.

Alcohols from the second stage of the reaction are used as intermediates for the preparation of plasticizers and detergents. Alcohols prepared by the Oxo reaction and having from eight to sixteen carbon atoms find maximum usefulness for these purposes. The carbonylation, or Oxo stage, as it is sometimes called, is widely useful and is used effectively with both long and short chain olefinic compounds, depending on the type alcohol desired. Thus, straight and branch chained olefins and diolefins such as propylene, butylene, butadiene, pentene, pentadiene, hexene, heptene, olefin polymers such as di- and tri-isobutylene, the hexene and heptene dimers, polypropylenes, and olefinic fractions from the hydrocarbon synthesis process or from thermal or catalytic cracking operations, and other sources of hydrocarbon fractions containing such olefins may be used as starting materials, depending on the nature of the final product desired. In general, olefins having up to about 18–20 carbon atoms in the molecule are preferred in this reaction. Olefins of $C_7$ to $C_{15}$ ranges are, of course, required to prepare the commercially preferred $C_8$ to $C_{16}$ alcohols.

The catalysts for the first stage of the process are usually employed in the form of the catalytically active metal salts of high molecular weight fatty acids such as stearic, palmitic, oleic, naphthenic and similar acids. Thus, examples of suitable catalysts are such organic salts as cobalt stearate, oleate, or naphthenate or iron linoleate. These salts are soluble in the liquid olefin feed and may be supplied to the first reaction zone as hydrocarbon solutions, preferably dissolved in the olefin feed.

The synthesis gas mixture fed to the first stage may consist of any ratio of $H_2$ to CO, but preferably these two gases are present at about one volume hydrogen per volume of CO. The conditions for the reaction of olefins with $H_2$ and CO vary somewhat in accordance with the nature of the olefin feed, but the reaction is generally conducted at pressures in the range of about 1500 to 4500 p. s. i. g., and at temperatures in the range of about 150° to 450° F.

The hydrogenation stage may be operated at conventional hydrogenation conditions which include temperatures, pressures, gas and liquid feed rates approximately within the ranges specified above for the first stage. Various known types of hydrogenation catalysts such as nickel, tungsten, molybdenum, their oxides and sulfides and others may be used. These include catalysts of both the sulfur sensitive and sulfur insensitive types. The catalyst may be supported on some suitable carrier such as charcoal. The liquid product from the hydrogenation stage is worked up by distillation to separate the desired alcohols from unconverted olefinic feed material, unhydrogenated carbonyl compounds, and saturated hydrocarbons formed in the process.

In the hydrogenation stage, in the presence of the hydrogenation catalysts and under the conditions employed, further condensations and reactions of the initially formed aldehydes and alcohols take place to give additional high boiling impurities which are generally allowed to remain as the "bottoms" after the distillation of the main portion of the alcohol is completed.

In a process for the manufacture of iso-octyl alcohol by a two-stage Oxo process using a predominantly $C_7$ olefinic feed, the final distillation of the crude $C_8$ alcohol product results in a bottom fraction representing about 15–30% of the crude alcohol charge to the distillation zone. This bottoms fraction consists of $C_8$ and some $C_9$ alcohols, as well as $C_{15}$–$C_{16}$ alcohols, $C_{24}$ acetals and $C_{16}$ ethers. Of these constituents, the $C_8$ alcohols represent the final traces (1–5%) remaining in the bottoms from the distillation of the main product. The remaining so-called bottoms consists primarily of higher boiling oxygenated compounds formed by side reactions as outlined above occurring in either the first or second stage of the $C_8$ alcohol process. As clearly as can be determined by chemical analysis and infra-red absorption spectographic study, these constituents were identified as $C_{15}$ secondary alcohols, $C_{15}$ aldehydes or ketones, $C_{24}$ acetals, $C_{22}$ esters of $C_{14}$ naphthenic acids used in making the cobalt catalyst for the first or oxonation stage, and saturated and unsaturated $C_{16}$ ethers. A typical chemical analysis of the higher boiling oxygenated compounds obtained in a plant, and free from $C_8$–$C_9$ alcohols fraction, is shown in Table I. The hydroxyl number, free and combined carbonyl numbers, and saponification and acid numbers are expressed in terms of milligrams of potassium hydroxide per gram of sample analyzed.

TABLE I

Typical composition of the Oxo Alcohol Bottoms

| Analysis | | Constituents, per cent by wt. |
|---|---|---|
| Hydroxyl No. | 95 | 48.6% $C_{15}$–$C_{16}$ alcohol. |
| Free Carbonyl No. | 0.5 | 0.2% $C_{15}$–$C_{16}$ aldehyde or ketone. |
| Combined Carbonyl No. | 29 | 19.1% $C_{24}$ acetal. |
| Saponification No. | 21 | 14.7% $C_{22}$ (octyl naphthenate ester). |
| Gravity, ° API | 33.3 | |
| Acid No. | 0.2 | |
| | | 17.4%[1] Saturated $C_{16}$ ether (dioctyl ether). |

[1] Calculated by difference.

Analytical results obtained by chemical and infra-red methods appear to be in essentially good agreement as indicated by their comparison in Table II below:

TABLE II

Comparison of analyses of Oxo Alcohol Bottoms

| | Chemical Method | Infra-red Method |
|---|---|---|
| Per cent $C_{15}$–$C_{16}$ alcohols | 48.6 | 43 |
| Per cent $C_{15}$–$C_{16}$ ketones | 0.2 | 4 |
| Per cent $C_{22}$ ester | 14.7 | 13 |
| Per cent $C_{24}$ acetal | 19.1 | 9 |
| Per cent acid | Trace | |
| Per cent saturated $C_{16}$ ether | 17.4 | 27 |
| Per cent unsaturated $C_{16}$ ether | | 3 |

Thus it can readily be seen that the synthetic Oxo processes give complex mixtures of compounds having various carbon structures in the molecules and having varied molecular weights. (As to the complex nature of these products see United States Bureau of Mines Publication, R. I. 4270 "Critical Review of Chemistry of Oxo Synthesis, etc.," June 1948).

The bottoms product from the $C_7$ olefin feed substantially free of $C_8$ alcohols, boils in the range of about 190° C. to about 18 weight per cent, boiling above 395° C. The presence of $C_8$ and $C_9$ alcohols do not affect the herbicidal activity but result in a lowering of boiling point as compared to the alcohol free product.

It is to be understood that whenever the term "Oxo Bottoms" is used in the specification, it indicates a still bottoms product produced by the indicated two-stage operation. As mentioned above, these Oxo Bottoms by themselves kill turf grass but only cause light to moderate injury to crab grass.

The concentrations of the ingredients of the compositions of this invention have been found to be quite critical. The operative ranges are as follows:

Oxo Bottoms 0.1 to 10 weight per cent, and preferably 2 to 5 weight per cent.
Sulfuric acid-treated kerosene q. s. 100%

These ranges are applicable for compositions which are to be applied to lawns or cultivated areas at rates of approximately one quart to one gallon per 100 square feet of lawn or cultivated area. The amount of Oxo Bottoms varies approximately inversely as the amount of the composition applied to the cultivated area. Typical formulations are indicated in the detailed examples below.

The following examples illustrate this invention and indicate test results obtained on the compositions of this invention.

EXAMPLE 1

A mixture of 2 weight per cent Oxo Bottoms and 98 weight per cent sulfuric acid-treated kerosene was applied directly in the form of a fine spray to a plot of lawn composed mainly of blue grass (Poa pratensis) heavily infested with mature crab grass. The rate of application was one gallon of herbicide per hundred square feet of lawn. A 1% aqueous solution of solubilized phenyl mercuric acetate and a 1.25% aqueous solution of sodium arsenite were likewise applied to adjoining plots of lawn at rates of one gallon per hundred square feet of lawn and one-half gallon per hundred square feet of lawn respectively (concentrations and application rates as recommended by manufacturers). Results are listed in Table III.

TABLE III

| Crab Grass Killer | Observations 10 Days after Application | |
| --- | --- | --- |
| | Crab Grass | Turf Grass |
| 2 wt. per cent Oxo Bottoms in Sulfuric acid-treated Kerosene. | Severe injury. Discolored, stunted and killed. No heading. | No injury. |
| Solubilized Phenyl mercuric acetate, 1% aqueous solution. | Slight discoloration; no complete kill. | Moderate discoloration. |
| Sodium Arsenite, 1.25% aqueous solution. | Discoloration with some kill. | Completely burned and dead. |

This example indicates the superiority of the compositions of this invention as regards both crab grass phytotoxity and selectivity as compared to conventional crab grass killers.

EXAMPLE 2

A mixture of 5 weight per cent Oxo Bottoms and 95 weight per cent sulfuric acid treated kerosene was applied as in Example 1 to a similar plot of lawn at an application rate of one gallon per hundred square feet of lawn. Results are listed in Table IV.

TABLE IV

| Crab Grass Killer | Observations 3 Days after Application | |
| --- | --- | --- |
| | Crab Grass | Turf Grass |
| 5 wt. per cent Oxo Bottoms in sulfuric acid treated kerosene. | Discoloration, severe injury and kill. | No injury. |

This example illustrates how crab grass kills may be obtained in shorter intervals with no turf grass injury through the utilization of compositions containing Oxo Bottoms at higher concentrations.

EXAMPLE 3

A mixture of 10 weight per cent Oxo Bottoms and 90 weight per cent sulfuric acid treated kerosene was applied as in Example 1 to a similar plot of lawn at an application rate of one quart per hundred square feet of lawn. Results are listed in Table V.

TABLE V

| Crab Grass Killer | Observations 3 Days after Application | |
| --- | --- | --- |
| | Crab Grass | Turf Grass |
| 10 wt. per cent Oxo Bottoms in sulfuric acid treated kerosene. | Severe discoloration, injury and kill. | Slight injury. |

This example illustrates the manner in which more concentrated solutions of Oxo Bottoms can be utilized to achieve economy of spraying.

The compositions of this invention are applied by suitable spray equipment to lawns which are infested with crab grass. The crab grass is rapidly discolored, stunted and killed. Heading and the possibility of the crab grass reseeding itself is eliminated, but desirable turf grasses are not injured appreciably and continue to grow lushly. Excellent crab grass control is obtained with the compositions of this invention, even though the crab grass is fully matured when the eradicants are applied. The dangers of soil sterilization and toxic effects on animals and human beings are minimized because of the lower concentrations of metal salts than is used in the prior art. Clover, which frequently is a desirable component of a lawn, is uninjured by the herbicides of this invention. Results in terms of crab grass stunting and destruction are often apparent the next day through the use of the compositions of this invention.

It is to be understood that this invention is not limited to the specific examples which have been offered merely as illustrations and that modifications may be made without departing from the spirit of this invention.

What is claimed is:

1. A selective crab grass herbicidal composition comprising in combination a sulfuric acid-treated kerosene, said acid-treated kerosene having a specific gravity in the range of about 0.775–0.825, a boiling point predominantly in the range of about 400°–505° F., and being substantially free of aromatics and from 0.1 to 10 weight per cent based on the total composition of a mixture of oxygenated organic compounds produced as a still bottoms product in a two-stage operation consisting of a first stage in which hydrogen, carbon monoxide and a $C_7$–$C_{15}$ olefin are contacted in the presence of a carbonylation catalyst forming a product predominantly aldehyde and of a second stage, in which the said aldehyde product is catalytically reduced with hydrogen to form the corresponding alcohol from which the major portion of low-boiling alcohol components is removed by distillation, leaving behind the still bottoms product.

2. A composition as in claim 1 in which the olefin employed in stage 1 of the two-stage operation for producing the bottoms still product is a $C_7$ olefin and the bottoms product consists predominantly of alcohols, acetals, esters, and ethers having from 15 to 24 carbon atoms.

3. A selective crab grass herbicidal spray composition adapted for application at the rate of approximately one gallon of herbicidal composition per one hundred square feet of cultivated area consisting essentially of about 98 weight percent sulfuric acid-treated kerosene, said acid-treated kerosene having a specific gravity in the range of 0.775–0.825, a boiling point predominantly in the range of 400°–505° F., and being substantially free of aromatics, and about 2 weight percent of a mixture of oxygenated organic compounds produced as a still bottoms product in a two-stage operation consisting of a first stage in which hydrogen, carbon monoxide and a $C_7$–$C_{15}$ olefin are contacted in the presence of a carbonylation catalyst forming a product predominantly aldehyde and of a second stage, in which the said aldehyde product is catalytically reduced with hydrogen to form the corresponding alcohol, from which the major portion of low-boiling alcohol components is removed by distillation, leaving behind the still bottoms product.

JOHN F. McKAY, Jr.
LEO Z. JASION.

No references cited.